Feb. 9, 1932.　　　　J. J. WEBER　　　　1,844,084
SURFACE ORNAMENTATION AND METHOD OF PRODUCING SAME
Filed May 9, 1928
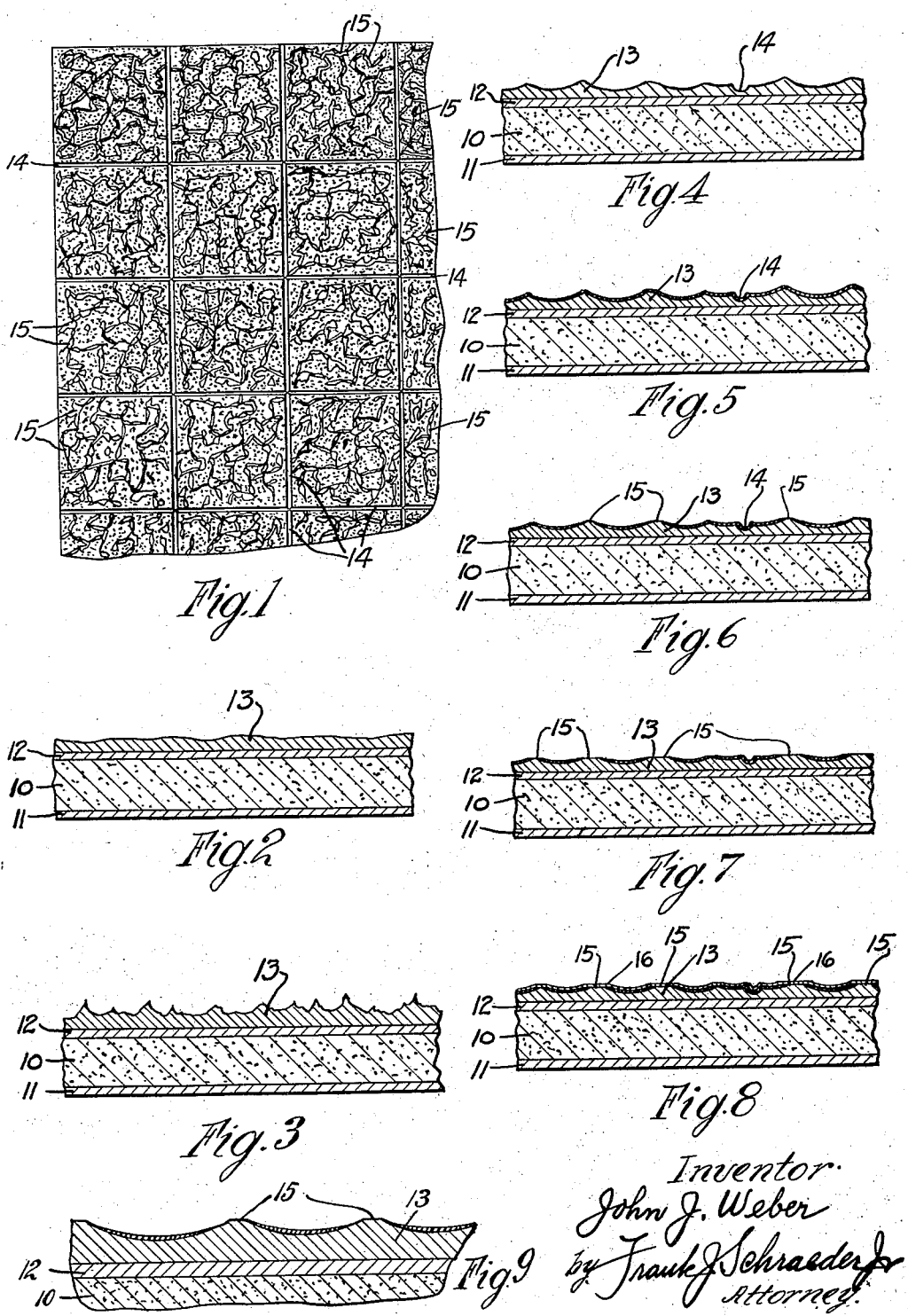

Patented Feb. 9, 1932

1,844,084

UNITED STATES PATENT OFFICE

JOHN J. WEBER, OF WILMETTE, ILLINOIS, ASSIGNOR TO J. H. JOCHUM, JR., OF CHICAGO, ILLINOIS

SURFACE ORNAMENTATION AND METHOD OF PRODUCING SAME

Application filed May 9, 1928. Serial No. 276,235.

The invention relates to surface ornamentation and more particularly to artificial tile and the method of producing the same.

It is an object of the invention to produce on wallboard or similar inexpensive material a surface ornamentation in simulation of tile.

It is a further object to provide a novel method for producing artificial tile on wallboard, and the like, whereby the ornate product may be produced efficiently and at comparatively low cost.

A still further object aims at applying a composition of matter to wallboard, subjecting the same to certain treatment and subsequently applying a differently colored composition to the surface of the applied composition, whereupon the second composition is treated so as to permit the first composition to appear and become visible in areas or spots to produce a colorful and decorative simulation of tile.

With these and other equally important objects in view which will become apparent from the description of the invention, the latter comprises the means and the steps of the method described in the following specification, particularly pointed out in the claims forming a part thereof, and illustrated in the accompanying drawings, in which Fig. 1 is a plan view of the finished product.

Figs. 2 to 8 inclusive show various steps in the production of the improved tile.

Fig. 9 is an enlarged cross section showing the sanded or leveled high spots 15 and the glazing or coloring matter as it lays in the low places and gradually thins out on the slopes of the higher areas to produce a variation in the density of the applied glazing.

In producing the surface ornamentation or tile, a wallboard of any suitable make or construction is provided, as for example, the plaster board 10, which has on each side a paper covering 11 and 12, respectively. Thereafter a plastic composition 13 is applied to the upper surface in the form of a layer as shown in Fig. 2, by means of a brush.

The plastic composition preferably has for its ingredients rye flour, water, linseed oil, japan dryer, and whiting. In producing the composition, 9 lbs. of rye flour (Pillsbury Millbrook) or equivalent, are placed in a mixing can and 24 lbs. of boiling water are slowly added and mixed thoroughly with the flour to produce a heavy thick paste at a temperature within 105° to 110° Fahrenheit, then 48 lbs. of water are slowly added at a temperature of 78° F. and thoroughly mixed, to produce a smooth mixture. Subsequently, 20 lbs. of pure boiled linseed oil, are added at a temperature of from 68° to 70° F. and mixed therewith for about one minute. This forms what I term the "base liquid."

Of the base liquid thus obtained, 8 gallons are placed in a mixing can at a temperature of 60° F., then one pint of japan dryer, of turpentine base, or its equivalent is added at room temperature and mixed for one minute. Then whiting, or its equivalent, is slowly added in sufficient quantities and mixed for about 10 minutes. I prefer to use whiting known as 425 V brand by Goris & Arnstein, or Canadian whiting.

In order to produce heavy tile, 112 lbs. of whiting are added and for light tile 81 lbs. are added.

As indicated in Fig. 3, the composition, immediately following its application, indicated in Fig. 2, is roughened or "pulled" by means of a large stippling brush so that the entire surface presents a stippled appearance.

Thereafter, the composition is permitted to dry a sufficient length of time to permit the mass to somewhat set as shown in Fig. 4, to lose its excess surface moisture whereupon the board may be placed on a ruling table and grooves 14, intersecting each other at right angles to define squares, are formed.

This may be accomplished by placing the board on a ruling table and ruling in the grooves, by using a straight edge placed in a fixed slotted guide on each side and end of the ruling table, whereupon a looped wire or grooving tool is drawn through the plastic composition at proper intervals. Each ruling line extends the full length and width of the board.

The board is then permitted to thoroughly dry. Then the entire surface is covered with a glaze (as shown in Fig. 5) of any suitable color; this glaze is applied to the surface preferably by means of a brush. This application of the glaze will soften the basic composition forming the body of the tile as the oxidation of the oil has not taken place, and the paste which is contained in the compound will be softened by the moist application of the glaze. The two applications, to-wit; the compound and the glaze will combine and the whole will become a monolithic mass or homogeneous structure. The glaze preferably has for its ingredients coloring matter, linseed oil, turpentine, dry zinc white, the aforementioned base liquid and starch mixture.

In producing the glaze, 3 ounces of coloring matter, or several colors ground in oil, of a shade to suit the requirements, are mixed together, constituting mixture A. Then 3 ounces of linseed oil are mixed with 1 ounce of turpentine, and form what may be designated as mixture B. The mixture B is then mixed with mixture A. Thereafter, 5 ounces of dry zinc white and 3 ounces of linseed oil are mixed with 1 ounce of turpentine, giving a mixture known as C, then the mixture A and B and mixture C are mixed to produce the mixture designated as mixture D. Subsequently, one gallon of the "base liquid" and one gallon of a starch mixture are mixed together to form a mixture E. The starch mixture comprises ½ lb. of starch mixed with 3 gallons of boiling water. By taking one gallon of "base liquid" at a temperature of 150° F. and adding thereto, slowly, and mixing thoroughly.

To produce the glaze, I now slowly and thoroughly mix one gallon of the "base liquid" at temperature of 150° F. with the mixture D and then add and mix therewith a sufficient quantity of the mixture E to produce the desired shade.

Having applied the glaze to the surface of the composition base as above stated and shown in Fig. 5, I then proceed to remove the glaze from the high spots or areas by drawing the squeegee over the entire surface, using sufficient pressure to wipe off the glaze from the high spots and areas and deposit the same into the low places, so that irregular outlines of spots or areas 15 of the base composition become visible as through the glaze as shown in Fig. 6.

After this operation, the product is permitted to dry or the drying may be forced. The product may then be put through a sanding machine for a light surface sanding to further level the high spots or areas and positively remove the glazing therefrom, a cross-section of same would appear as indicated in Fig. 7. The surface is then cleaned of all loose particles by means of a brush or compressed air.

Finally, a coating of suitable lacquer 16 is applied to the surface as shown on Fig. 8.

I claim:—

1. The method of producing surface ornamentation in simulation of tile which consists in applying a plastic coating to the surface to be ornamented, then roughening the surface of said composition, then permitting drying of the composition, then softening the first applied composition by the application to the surface thereof, a second composition of different color to the first composition to cause the two compositions to combine into a monolithic mass, and then removing the second coating from certain of the high points of said surface and depositing the coating thus removed, into the low areas.

2. The method of producing surface ornamentation in simulation of tile which consists in applying a plastic coating to the surface to be ornamented, then roughening the surface of said composition, then permitting drying of the composition, then softening the first applied composition by the application to the surface thereof, a second composition of different color to the first composition to cause the two compositions to combine into a monolithic mass, and then removing the second coating from certain of the high areas of said surface and depositing the coating thus removed in gradually increasing thickness from the high areas towards the bottom of the low areas.

3. The method of producing surface ornamentation in simulation of tile which consists in applying a plastic coating to the surface to be ornamented, then roughening the surface of said composition, then partially drying the composition and while partially dried, marking or scoring the exposed surface to form border lines, then permitting further drying, then softening the first applied composition by the application to the surface thereof, a second composition of different color to the first composition to cause the two compositions to combine into a monolithic mass, and then removing the second coating from certain areas of the first applied composition.

4. The method of producing surface ornamentation in simulation of tile which consists in applying a plastic coating to the surface to be ornamented, then roughening the surface of said composition, then permitting drying of the composition, then softening the first applied composition by the application to the surface thereof, a second composition of different color to the first composition to cause the two compositions to combine into a monolithic mass, and then removing the second coating from certain of the high points of said surface and depositing the coating thus removed, into the low areas, and then abrasively treating the high spots or areas.

5. The method of producing surface ornamentation in simulation of tile which consists in applying a plastic composition to a surface to be ornamented, then roughening the exposed surface of said composition, then applying a coating of a different colored composition to said surface of a substantially uniform thickness over the entire exposed surface, then removing the coating from certain areas of the surface and utilizing the coating removed from the last recited areas to increase the thickness of the coating over other and adjacent areas.

6. The method of producing surface ornamentation in simulation of tile which consists in applying a plastic composition to a surface to be ornamented, then roughening the exposed surface of said composition, then applying a coating of a different colored composition to said surface of a substantially uniform thickness over the entire exposed surface, then removing the coating from certain areas of the surface and utilizing the coating removed from the last recited areas to increase the thickness of the coating over other and adjacent areas, the said increase in thickness of the coating being gradual towards the lowest point in the last recited areas.

In witness whereof I affix my signature.

JOHN J. WEBER.